(12) United States Patent
Nagashima et al.

(10) Patent No.: US 6,340,646 B1
(45) Date of Patent: *Jan. 22, 2002

(54) COLORED FILM-COATED ULTRAVIOLET/INFRARED ABSORBENT GLASS PLATE AND WINDOW GLASS OF VEHICLE

(75) Inventors: Yukihito Nagashima; Mitsuhiro Kawazu; Toshifumi Tsujino, all of Osaka (JP)

(73) Assignee: Nippon Sheet Glass Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/437,229

(22) Filed: Nov. 10, 1999

Related U.S. Application Data

(63) Continuation of application No. PCT/JP98/05039, filed on Nov. 10, 1998.

(30) Foreign Application Priority Data

Nov. 13, 1997 (JP) .............................. 9-312520
Nov. 18, 1997 (JP) .............................. 9-316852

(51) Int. Cl.$^7$ ........................ C03C 3/095; C03C 3/087; B32B 17/00
(52) U.S. Cl. ............................. 501/64; 501/70; 501/71; 428/325; 428/328; 428/428; 428/434
(58) Field of Search ................ 501/64, 70, 71; 428/434, 325, 328, 428

(56) References Cited

U.S. PATENT DOCUMENTS

| | | | | | |
|---|---|---|---|---|---|
| 5,264,400 A | * | 11/1993 | Nakaguchi et al. | ............ | 501/71 |
| 5,318,931 A | * | 6/1994 | Nakaguchi et al. | ............ | 501/64 |
| 5,776,846 A | * | 7/1998 | Sakaguchi et al. | ............ | 501/70 |
| 5,830,812 A | * | 11/1998 | Shelestak et al. | ............ | 501/71 |
| 5,897,956 A | * | 4/1999 | Kijima et al. | ............ | 428/426 |
| 5,942,331 A | * | 8/1999 | Miyauchi et al. | ............ | 501/428 |
| 5,958,811 A | * | 9/1999 | Sakaguchi et al. | ............ | 501/71 |
| 5,976,678 A | * | 11/1999 | Kawazu et al. | ............ | 428/208 |
| 6,017,836 A | * | 1/2000 | Nagashima et al. | ............ | 501/64 |
| 6,046,122 A | * | 4/2000 | Nagashima et al. | ............ | 501/64 |
| 6,060,151 A | * | 5/2000 | Shirashi et al. | ............ | 420/209 |

FOREIGN PATENT DOCUMENTS

JP      9-208254      8/1997

* cited by examiner

*Primary Examiner*—Karl Group
(74) *Attorney, Agent, or Firm*—Kanesaka & Takeuchi

(57) ABSTRACT

A colored film-coated ultraviolet/infrared absorbent glass plate is formed of base glass, colorants, and a colored film. The base glass includes 65 to 80 wt. % $SiO_2$; 0 to 5 wt. % $Al_2O_3$; 0 to 10 wt. % MgO; 5 to 15 wt. % CaO; 10 to 18 wt. % $Na_2O$; 0 to 5 wt. % $K_2O$; 5 to 15 wt. % total amount of MgO and CaO; 10 to 20 wt. % total amount of $Na_2O$ and $K_2O$; 0.05 to 0.3 wt. % of $SO_3$; and 0 to 5 wt. % $B_2O_3$. The colorants includes 0.35 to 0.55 wt. % total iron oxide (T-$Fe_2O_3$) expressed as $Fe_2O_3$; 0.08 to 0.15 wt. % FeO; 0.8 to 1.5 wt. % $CeO_2$; and 0 to 0.5 wt. % $TiO_2$. FeO expressed as $Fe_2O_3$ is equal to or more than 20 wt. % and less than 27 wt. % of T-$Fe_2O_3$. The colored film has a red color shade with a thickness between 30 nm and 300 nm and includes fine particles of gold and silicon oxide of more than 50 wt. % and equal to or less than 95 wt. %. The colored film is applied onto a surface of the ultraviolet/infrared absorbent glass plate.

19 Claims, No Drawings

COLORED FILM-COATED ULTRAVIOLET/ INFRARED ABSORBENT GLASS PLATE AND WINDOW GLASS OF VEHICLE

CROSS REFERENCE TO RELATED APPLICATION

This is a continuation application of PCT/JP98/05039 filed on Nov. 10, 1998.

FIELD OF THE INVENTION

The present invention relates to an ultraviolet/infrared absorbent glass having a greenish color shade. Particularly, it relates to a colored film-coated ultraviolet/infrared absorbent glass plate prepared by applying a colored film having a red color shade onto the ultraviolet/infrared absorbent glass plate and a window glass of a vehicle employing the colored film-coated ultraviolet/infrared absorbent glass plate.

BACKGROUND OF THE INVENTION AND RELATED ART STATEMENT

Recently, a variety of glasses having an ultraviolet/infrared absorptivity and a greenish color shade to be used as a vehicle windshield has been proposed with the view of preventing degradation of luxurious interior materials and reducing cooling load of the vehicle.

For example, an ultraviolet/infrared absorbent glass having a greenish color shade disclosed in Japanese Patent H6-88812B consists of soda-lime glass including colorants consisting of 0.65 to 1.25 wt. % total iron oxide expressed as $Fe_2O_3$, 0.2 to 1.4 wt. % $CeO_2$ or 0.1 to 1.36 wt. % $CeO_2$ and 0.02 to 0.85 wt. % $TiO_2$.

An ultraviolet/infrared absorbent glass having a relatively light greenish color shade disclosed in Japanese Patent H5-78147A consists of a base glass consisting of 68 to 72 wt. % $SiO_2$, 1.6 to 3.0 wt. % $Al_2O_3$, 8.5 to 11.0 wt. % CaO, 2.0 to 4.2 wt. % MgO, 12.0 to 16.0 wt. % $Na_2O$ and 0.5 to 3.0 wt. % $K_2O$ and colorants comprising 0.58 to 0.65 wt. % total iron oxide expressed as $Fe_2O_3$, 0.1 to 0.5 wt. % $CeO_2$ and 0.1 to 0.4 wt. % $TiO_2$.

An ultraviolet/infrared absorbent glass disclosed in Japanese Patent H8-208266A and Japanese Patent H9-208254A has a relatively high visible light transmittance and a greenish color shade having high see-through visibility.

An ultraviolet/infrared absorbent glass disclosed in Japanese Patent H8-208266A consists of soda-lime-silica glass including colorants comprising 0.52 to 0.63 wt. % total iron oxide expressed as $Fe_2O_3$, 0.9 to 2 wt. % total $CeO_2$ and 0.2 to 0.6 wt. % $TiO_2$ wherein the divalent iron oxide expressed as $Fe_2O_3$ is 28 to 38 wt. % of the total iron oxide expressed as $Fe_2O_3$.

An ultraviolet/infrared absorbent glass disclosed in the Japanese Patent H9-208254A consists of a base glass comprising 67 to 75 wt. % $SiO_2$, 0.05 to 3.0 wt. % $Al_2O_3$, 7.0 to 11.0 wt. % CaO, 2.0 to 4.2 wt. % MgO, 12.0 to 16.0 wt. % $Na_2O$, 0.5 to 3.0 wt. % $K_2O$, 0.05 to 0.30 wt. % $SO_3$ and 0 to 1 wt. % $SnO_2$ and colorants comprising 0.40 to 0.90 wt. % the total iron oxide expressed as $Fe_2O_3$, 1.0 to 2.5 wt. % $CeO_2$, 0.1 to 1.0 wt. % $TiO_2$, 0.0010 to 0.040 wt. % MnO, 0.0001 to 0.0009 wt. % CoO and 0.0001 to 0.0010 wt. % $Cr_2O_3$.

The colored film-coated glass can be prepared in an ion exchanging process in which ultra fine particles of an inorganic salt including silver or copper transmit into the glass base due to baking the glass applied with the inorganic salt including the silver or the copper on a surface thereof to cause transparent colloidal development, in a metallic film forming process in which a metallic film is flashed onto a glass base due to sputtering, or in a film forming process in which a film of metallic ultrafine particles is formed due to heating a glass base applied with the metallic salt compound dissolved in a solution of metal alcoxide.

Color development due to surface plasmon of metallic ultrafine particles is superior in heat resistance and light resistance and has been used in coloring of glass or earthenware. For example, according to J. Sol-Gel. Sci. Techn. 1,305–312 (1994), a colored film is obtained due to forming fine particles of gold by heating a glass base applied with a solution of alcoxide including chloroaurate and silane.

The aforementioned conventional ultraviolet/infrared absorbent glasses generally have problems as followings.

An ordinary ultraviolet/infrared absorbent glass having a greenish color shade including the glass disclosed in the Japanese Patent H6-88812B is possibly improved in the ultraviolet and infrared absorptivity so far as the visible light transmittance is within a permissive range (for example, more than 70% when the glass is employed for a front windshield of a vehicle.) and has a relatively deep greenish color shade having an excitation purity in a range of 2.4 to 3.3%. However, a glass having a light greenish color shade is sometimes preferred for a window of a vehicle and for a window of a building.

A glass having a possibly high ultraviolet and infrared absorptivity with a high visible light transmittance can be often required for a window of a building.

A glass plate can be employed for a window of a vehicle not only alone but with a variety of coatings applied onto a surface thereof. When the glass has a coating on the surface thereof, the coating reduces the visible light transmittance of the glass plate. Therefore, when the glass has a visible light transmittance having a value that is proximate to a lower limit of the aforementioned permissive range before being applied with a coating, even if the value is in the permissive range (for example, a value of slightly more than 70%), the value of the visible light transmittance easily becomes less than 70% after applying the coating. In this case, the glass can be hardly applied with a desired coating thereon.

The ultraviolet/infrared absorbent glass disclosed in the Japanese Patent H5-78147A has a relatively lighter greenish color shade. The glass having a thickness of 5 mm has a visible light transmittance of 71% at most, which is not sufficiently high. Although the glass has a relatively lighter greenish color shade having an excitation purity of equal to or less than 5%, specifically, the value of the excitation purity is equal to or more than 3.2% and its greenish color shade can not be light enough.

The ultraviolet/infrared absorbent glass disclosed in the Japanese Patent H8-208266A has a relatively high visible light transmittance and includes the total iron oxide expressed as $Fe_2O_3$ in a range of 0.52 to 0.63 wt. % and the iron having two valences expressed as $Fe_2O_3$ in a range of 28 to 38 wt. % of the total iron oxide. Although the glass provides a high solar rays absorptivity, i.e. a low solar energy transmittance, the visible light transmittance of the glass is in a range of 72.0 to 74.4% when the glass has a thickness of 3.5 mm, in a range of 71.4 to 72.9% when the glass has a thickness of 5 mm, which is not high enough in substantial.

Although the ultraviolet/infrared absorbent glass disclosed in the Japanese Patent H9-208254A has a relatively high see-through visibility and is provided with a high solar rays absorptivity, the visible light transmittance thereof is in a range 65.5 to 67.6% when the glass has a thickness of 5 mm, and it is not high enough in substantial. The excitation purity thereof is equal to or more than 2.9% and the greenish color shade thereof can not be light enough.

DISCLOSURE OF THE INVENTION

It is an object of the present invention to solve the aforementioned conventional problems and to provide a colored film-coated ultraviolet/infrared absorbent glass plate prepared by coating the ultraviolet/infrared absorbent glass plate with a colored film having a red color shade, and a window glass of a vehicle employing the colored film-coated ultraviolet/infrared absorbent glass plate.

An ultraviolet/infrared absorbent glass of a first aspect of the present invention consists of a base glass comprising:

65 to 80 wt. % $SiO_2$;

0 to 5 wt. % $Al_2O_3$;

0 to 10 wt. % $MgO$;

5 to 15 wt. % $CaO$;

10 to 18 wt. % $Na_2O$;

0 to 5 wt. % $K_2O$;

5 to 15 wt. % a total amount of $MgO$ and $CaO$;

10 to 20 wt. % a total amount of $Na_2O$ and $K_2O$;

0.05 to 0.3 wt. % $SO_3$; and 0 to 5 wt. % $B_2O_3$, and a colorant including:

0.35 to 0.55 wt. % total iron oxide (T-$Fe_2O_3$) expressed as $Fe_2O_3$;

0.08 to 0.15 wt. % $FeO$;

0.8 to 1.5 wt. % $CeO_2$; and 0 to 0.5 wt. % $TiO_2$,

FeO expressed as $Fe_2O_3$ being equal to or more than 20 wt. % and less than 27 wt. % of T-$Fe_2O_3$.

An ultraviolet/infrared absorbent glass plate of a second aspect of the present invention is composed of the ultraviolet/infrared absorbent glass of the first aspect wherein the visible light transmittance is equal to or more than 75% when measured by using the CIE illuminant A, the solar energy transmittance is equal to or less than 60%, the ultraviolet transmittance specified by ISO is equal to or less than 15%, the dominant wavelength is between 495 nm and 535 nm when measured by using the CIE illuminant C, and the excitation purity is equal to or less than 2.5% when measured by using the CIE illuminant C.

A colored film-coated ultraviolet/infrared absorbent glass plate of a third aspect of the present invention is provided by applying the colored film having a red color shade with a thickness of between 30 nm and 300 nm which includes the silicon oxide and the fine particles of the gold onto the surface of the ultraviolet/infrared absorbent glass plate of the second aspect.

A window glass of a vehicle of a fourth aspect of the present invention consists of at least two glass plates laminated together with an inner layer of a transparent resin or a spacing layer wherein at least one of these glass plates employs the colored film-coated ultraviolet/infrared absorbent glass plate, the visible light transmittance is equal to or more than 70% when measured by using the CIE illuminant A the solar energy transmittance is equal to or less than 70%, the ultraviolet transmittance specified by ISO is equal to or less than 15%, and the chromaticity expressed as a, b by using the Lab coordinates is in ranges of $-2 \leq a \leq 4$ and $-3 \leq b \leq 3$ when measured by using the CIE illuminant C.

DETAILED DESCRIPTION OF PREFERRED EMBODIMENTS

The description will be made as regard to an ultraviolet/infrared absorbent glass composition. It should be noted that components will be represented with percentage by weight.

$SiO_2$ is a principal component for forming skeleton of glass. Less than 65% $SiO_2$ lowers durability of the glass and more than 80% $SiO_2$ raises a melting temperature of the glass so high. $SiO_2$ is comprised accordingly within a range of 65 to 80%

$Al_2O_3$ is not an essential component but a component for improving the durability of the glass. More than 5% $Al_2O_3$ raises the melting temperature of the glass so high. $Al_2O_3$ is comprised within a range of 0 to 5%, preferably in a range 0.1% and 2.5%.

CaO improves the durability of the glass and adjusts a devitrification temperature and viscosity of the glass during molding. Less than 5% or more than 15% CaO raises the devitrification temperature of the glass. CaO is comprised accordingly within a range of 5 to 15%.

While MgO may not be comprised essentially, MgO can improve the durability of the glass and adjust the devitrification temperature and viscosity of the glass during molding just as CaO. More than 10% MgO raises the devitrification temperature. The durability of the glass is lowered when the total amount of MgO and CaO is less than 5%, while the devitrification temperature is increased when the total exceeds 15%. MgO is comprised accordingly in a range of 0 to 10% and the total amount of MgO and CaO is in a range of 5 to 15%.

$Na_2O$ prompts the glass to melt. The efficiency of promotion of melting becomes poor when $Na_2O$ is less than 10%, while the durability of the glass is lowered when $Na_2O$ exceeds 18%. $Na_2O$ is comprised accordingly in a range of 10 to 18%.

While $K_2O$ may not be comprised essentially, $K_2O$ can prompt the glass to melt just as $Na_2O$. $K_2O$ is preferable not to exceed 5% because of its expensive cost. Therefore, $K_2O$ is comprised in a range of 0 to 5%. The efficiency of promotion of melting becomes poor when the total of $Na_2O$ and $K_2O$ is less than 10%, while the durability of the glass is lowered when the total of $Na_2O$ and $K_2O$ exceeds 20%. The total amount of $Na_2O$ and $K_2O$ is in a range of 10 to 20%.

$SO_3$ prompts the glass to be purified. The efficiency of purification becomes poor in the usual dissolution process when $SO_3$ is less than 0.05%, while bubbles formed due to decomposition of $SO_3$ remain in the glass and the bubbles are easily formed during reboiling the glass when $SO_3$ is more than 0.3%. $SO_3$ is comprised accordingly in a range of 0.05 to 0.3%, preferably in a range of 0.05 to 0.15%.

$B_2O_3$ is not an essential component but a component for improving the durability of the glass, prompting to melt, and yet enhancing the ultraviolet absorption. The transmittance is reduced also at a visible range, so that the color of the glass is easy to be tinged with yellow and difficulties during molding are caused due to the vaporization of $B_2O_3$ when $B_2O_3$ exceeds 5%. $B_2O_3$ is comprised accordingly in a range of 0 to 5%.

Iron oxide is present in the form of $Fe_2O_3$ and the form of FeO in the glass. $Fe_2O_3$ is a component for improving the ultraviolet absorptivity coupled with $CeO_2$, $TiO_2$ given later and FeO is a component for improving the heat rays absorptivity.

The desired visible light transmittance and the desired solar rays absorptivity require the total iron oxide (T-$Fe_2O_3$)

in a range of 0.35 to 0.55%, FeO in a range of 0.08 to 0.15% and the ratio of $FeO/T\text{-}Fe_2O_3$ (FeO is usually expressed as $Fe_2O_3$ when the ratio of $FeO/T\text{-}Fe_2O_3$ is determined.) of equal to or more than 0.20 and less than 0.27. The solar rays absorptivity cannot be improved sufficiently when the total iron oxide ($T\text{-}Fe_2O_3$), FeO and the ratio of $FeO/T\text{-}Fe_2O_3$ are below the lower limit of the respective range, while the visible light transmittance is excessively reduced when these items exceed the upper limit respectively.

The ratio of $FeO/T\text{-}Fe_2O_3$ is raised (or lowered) by increasing (or decreasing) an amount of reducing agents added into the glass including a trace of carbon, $SnO_2$ or the like. Therefore, the ratio of $FeO/T\text{-}Fe_2O_3$ can be controlled due to adjusting the amount of the reducing agents.

FeO is especially preferable to be in a range of 0.08 to 0.12%.

Under the aforementioned ranges of the content of the total iron oxide and the ratio of $FeO/T\text{-}Fe_2O_3$, $CeO_2$ is required to be included in a range of 0.8 to 1.5% to obtain the desired ultraviolet absorptivity. The ultraviolet absorptivity is insufficient when $CeO_2$ is less than 0.8%, while the visible rays having a short wavelength are excessively absorbed so that the visible light transmittance is reduced and the chromaticity expressed as the dominant wavelength becomes higher than the range of 495 nm to 535 nm to emphasize a yellow color of the shade undesirably when $CeO_2$ exceeds 1.5%.

$CeO_2$ is especially preferable to be in a range of equal to or more than 1.0% and less than 1.4%.

Although $TiO_2$ is not an essential component, a small amount of $TiO_2$ may be added suitably in such a range as not to lose the optical properties in the sights of the present invention (i.e. the visible light transmittance of equal to or more than 75%, the dominant wavelength of between 495 nm and 535 nm) for improving the ultraviolet absorptivity like $Fe_2O_3$ and $CeO_2$. Since the glass is easily tinged with yellow when $TiO_2$ is added too much, $TiO_2$ should be in a range of 0 to 0.5%, more preferably not more than 0.15%, most preferably not more than 0.05%.

MnO is not essential but useful for controlling the color tone and the ratio of $FeO/T\text{-}Fe_2O_3$ coupled with $Fe_2O_3$, FeO and $CeO_2$. MnO should be less than 350 ppm since an influence of coloring of MnO itself appears when MnO is added too much.

In the present invention, $SnO_2$ may be added into the glass having the aforementioned proportion in a range 0 to 1% as a reducing agent. While at least one among CoO, $Cr_2O_3$, NiO, $V_2O_5$, $MoO_3$ and the like may be further added as an ordinary colorant in such a range as not to lose the light greenish color shade in the sights of the present invention, the colorant is not very preferable to be added because it deepens the color tone of the glass and reduces the visible light transmittance.

The glass of the present invention at any thickness in a range of 3.25 mm to 6.25 mm is preferable to have optical properties as followings:

i) A visible light transmittance (Ya) is equal to or more than 75%, preferably equal to or more than 77.5%, when measured by using the CIE illuminant A over the wavelength range of 380 nm to 770 nm.

ii) A dominant wavelength (Dw) is between 495 nm and 535 nm when measured by using the CIE illuminant C over the wavelength range of 380 nm to 770 nm.

iii) A chromaticity of the transmitted light expressed as a, b of the Lab coordinates (Hunter style) when measured by using the CIE illuminant is in ranges of $-8 \leq a \leq -3$ and $-1 \leq b \leq 4$, preferably $-7 \leq a \leq -5$, $1 \leq b \leq 3$.

iv) An ultraviolet transmittance (Tuv) specified by ISO 9050 is equal to or less than 15%.

v) A solar energy transmittance (Tg) is equal to or less than 60%.

vi) An excitation purity (Pe) is equal to or less than 2.5%, preferably equal to or less than 2.0%, when measured by using the CIE illuminant C.

The ultraviolet/infrared absorbent glass plate of the present invention is made up from the ultraviolet/infrared absorbent glass having the aforementioned components and preferable to have a thickness between 3.25 mm and 6.25 mm and optical properties as followings:

1) The visible light transmittance (Ya) is equal to or more than 75%, preferably equal to or more than 77.5%, when measured by using the CIE illuminant A over the wavelength range of 380 nm to 770 nm.

2) The dominant wavelength (Dw) is between 495 nm and 535 nm when measured by using the CIE illuminant C over the wavelength range of 380 nm to 770 nm.

3) The chromaticity of the transmitted light expressed as a, b of the Lab coordinates (Hunter style) when measured by using the CIE illuminant is in ranges of $-8 \leq a \leq -3$ and $-1 \leq b \leq 4$, preferably $-7 \leq a \leq -5$, $1 \leq b \leq 3$ 4) An ultraviolet transmittance (Tuv) specified by ISO 9050 is equal to or less than 15%.

5) A solar energy transmittance (Tg) is equal to or less than 60%.

6) An excitation purity (Pe) is equal to or less than 2.5%, preferably equal to or less than 2.0%, when measured by using the CIE illuminant C.

The colored film-coated ultraviolet/infrared absorbent glass plate of the present invention is prepared by coating the ultraviolet/infrared absorbent glass plate with the colored film or layer having a red color shade with a thickness of between 30 nm and 300 nm which includes the silicon oxide and the fine particles of gold.

Hereinafter, the description will be made as regard to the colored film having a red color shade applied on the surface of the ultraviolet/infrared absorbent glass plate.

The colored film or layer having a red color shade is colored by the surface prasmon absorption of the fine particles of gold included therein. The color tone of the film is altered through a shift of the absorption range of the spectral absorbent characteristics depending on an index of refraction of a matrix surrounding the fine particle of gold.

The colored film having a red color shade employed in the present invention has a thickness of between 30 nm and 300 nm and includes the fine particles of gold distributed in the matrix composed mainly of the silicon oxide in consideration of durability. The colored film is preferable to include silicon oxide of more than 50 wt. % and not more than 95 wt. %, at least one selected from a group consisting of zirconium oxide, tantalum oxide, titanium oxide, aluminum oxide and cerium oxide in a range of 0 to 30 wt. %, fine particles of gold for coloring in a range of 5 to 20 wt. % as the base constituents. The colored film having the red color shade is ordinarily applied onto only one surface of the glass, but it may be applied onto both surfaces of the glass.

Hereinafter, constituents of the colored film will be described.

Silicon oxide is necessary as a matrix material having a small index of refraction to fix the fine gold particles therein and to make the color development of the fine gold particles reddish. Silicon oxide is further necessary to reduce reflectance of the colored film. When silicon oxide is contained too little, the reflectance rises excessively or the colored film becomes more blue tint because the surface prasmon absorption range of the fine gold particles shifts to the long-wave part. When silicon oxide is contained too much, the color of the colored film becomes pale and the efficiency of the silicon oxide becomes poor. Therefore, the content of silicon oxide expressed as $SiO_2$ is more than 50 wt. % and not more than 95 wt. %, preferably between 60 wt. % and 93 wt. %.

The colored film having the red color of the present invention is preferable to include at least one selected from a group consisting of zirconium oxide, tantalum oxide, titanium oxide, aluminum oxide and cerium oxide so as to control the color tone thereof. The reflectance of the film becomes excessively high when these color controlling constituents are contained too much. The color controlling constituents are preferable to be contained in a range of 0 to 30 wt. % in total, more preferably in a range of 0 to 15 wt. % in total.

The fine particles of gold are necessary to make the reddish film with a bright color. When contained too much, the fine particles of gold become to appear on the surface of the film and the durability of the film is reduced. When the fine particles of gold are contained too little, the film is not sufficiently colored. The fine particles of gold are preferable to be contained in a range of 5 to 20 wt. %, particularly in a range of 7 to 17 wt. %.

Too thin film is not sufficiently colored and too thick film reduces the durability thereof to be cracked easily. The film is required to have a thickness between 30 nm and 300 nm, preferably between 50 nm and 250 nm, more preferably between 50 nm and 200 nm.

When the index of refraction of the film is too high, the colored film-coated ultraviolet/infrared absorbent glass plate is increased in reflectance and not preferable in view of appearance. The composition of the film is controlled in such a manner that the film has the index of refraction in a range of 1.4 to 1.70, preferably in a range of 1.40 to 1.60, more preferably in a range of 1.45 to 1.55.

The colored film having a red color shade may be prepared by applying a solution comprising a compound for forming the fine gold particles, a raw material of silicon oxide and optionally raw materials of zirconium oxide, tantalum oxide, titanium oxide, aluminum oxide and cerium oxide, catalysts, additives and an organic solvent and then drying and baking.

Any raw material for silicon oxide is available so far as a transparent film with high strength can be formed in the Sol-Gel route and a superior stability can be secured. Such a raw material for silicon oxide is given next.

Metal alkoxide including tetramethoxysilane, tetraethoxysilane, tetrapropoxysilane, tetrabutoxysilane, a condensate condensed two or more among them ($n \geq 2$), and a mixture of the condensates is suitable for the raw material of silicone oxide.

Such a condensate may employ hexaethoxydisiloxane (n=2), octoethoxytrisiloxane (n=3), decaetoxytetrasiloxane (n=4), ethoxypolysiloxane ($n \geq 5$) and the like. Ethylsilicate 40 consisting of a mixture containing monomers (n=1) and condensates ($n \geq 2$) is preferably employed [the composition is shown on pages 253 through 268 of the document written by J. Cihlar under the title of "Colloids and Surface A: Physicochem. Eng. Aspects 70 (1993)", and comprises 12.8 wt. % monomer (n=1), 10.2 wt. % dimer (n=2), 12.0 wt. % trimer (n=3), 7.0 wt. % tetramer (n=4), 56.2 wt. % polymer ($n \geq 5$) and 1.8 wt. % ethanole].

Alkyltrialkoxysilane is also available wherein a part of alkoxy group of siliconalkoxyde is replaced by alkyl group for example by the linear or branched alkyl group including methyl group, ethyl group, propyl group, butyl group, 2-ethylbutyl group and octyl group, by cykloalkyl group including cyclopentyl group and cyclohexyl group, by alkenyl group including vinyl group, allyl group, γ-methacryloxypropyl group and γ-achryloxypropyl group, by aryl group including phenyl group, toluyl group and xylyl group, by aralkyl group including benzyl group and phenethyl group, and by γ-mercaptopropyl group, γ-chloropropyl group or γ-aminopropyl group.

The raw material of fine particles of gold may be not only chloride including chloroaurate but sulfide, cyano complex, halogeno complex, thioic acid, thiosulfato acid, sulfito complex, and auric acid of gold, and organogold compound or the like. Among them, chloroauric is preferable because of its stability and ease of acquisition.

Organotitanium compound including titanium alkoxide, titanium acetylacetonate and titanium carboxylate is a preferable raw material of titanium oxide. Titanium isopropoxide or titanium butoxide is employed for titanium alkoxide generally expressed by $Ti(OR)_4$ (R expresses alkyl group having 4 or less carbon atoms) in consideration of the reactivity. It is known that acetylacetonate is also preferable to be used because of its stability when obtaining the titanium oxide. In this case, titanium acetylacetonate is generally expressed by $Ti(OR)_m L_n$ (m+n=4, n≠0, L: acetylacetone). Titanium alkoxide may be varied into titanium acetylacetonate by acetylacetone. A commercial titanium acetylacetonate may be employed. Furthermore, carboxylic acid may be also employed.

Tetramethoxy zirconium, tetraethoxy zirconium, tetraisopropoxy zirconium, tetra-n-propoxy zirconium, tetraisopropoxy zirconium isopropanol complex, tetraisobutoxy zirconium, tetra-n-butoxy zirconium, tetra-sec-butoxy zirconium, tetra-t-butoxy zirconium and the like can be preferably employed as the raw material of zirconium oxide. Alkoxide of zirconium halogenate including zirconium monochloride trialkoxide formed by replacing alkoxy group of the compound expressed in the general formula (4) by halogen group, and zirconium dichloride dialkoxide can be also employed. Zirconium alkoxide formed by chelating the zirconium alkoxide by β-ketoester compound is also available.

Acetoacetic ester expressed by $CH_3COCH_3COOR$ (R expresses $CH_3$, $C_2H_5$, $C_3H_7$ or $C_4H_9$) including methyl acetoacetate, ethyl acetoacetate, propyl acetoacetate and butyl acetoacetate is given as the aforementioned ketoester compound for the chelating agent. Among them, acetoacetic alkylester, particularly methyl acetoacetate and ethyl acetoacetate are suitable because they are available at relatively low cost. Zirconium alkoxide may be chelated with a part or entire thereof and is preferable to be chelated at (β-ketoester compound)/(zirconium alkoxide) rate of 2 expressed as molar ratio so that the chelate compound is stable. A chelating agent except for β-ketoester compound, for example zirconium alkoxide chelated by acetylacetone is deposited because of its insolubility in solvent including alcoholic and prevents from preparation of the coating solution.

The raw material of zirconium oxide can further employ alkoxyzirconium organic acid formed by replacing organic acid including acetic acid, propionic acid, butanoic acid, acrylic acid, methacrylic acid and stearic acid for at least one of alkoxy groups of the zirconiumalkoxide.

Tantalumalkoxide and tantalum organic compound and the like are suitable for the raw material of tantalum oxide.

Cerium organic compound including ceriumalkoxide, ceriumacetylacetonate and ceriumcarboxylate can be preferably employed for the raw material of cerium oxide. Inorganic cerium compound including nitrate, chloride and sulfate can be also employed, and cerium nitrate and ceriumacetylacetonate are more suitable because of their stability and ease of acquisition.

Aluminum alkoxide, organic aluminum compound and inorganic aluminum compound are suitable for the raw material of aluminum oxide.

Inorganic acid including hydrochloric acid, nitric acid and sulfuric acid or organic acid including acetic acid, oxalic acid, formic acid, propionic acid and p-toluensulfonic acid is employed for a hydrolytic catalyst, when alkoxide is employed for each raw material of silicon oxide, zirconium oxide, tantalum oxide, titanium oxide, aluminum oxide and cerium oxide. The content of these acids may be in a range between 0.01 and 2, preferably in a range between 0.05 and 1.5 at the molar ratio against the metal alkoxide. In hydrolyzing of the metal alkoxide, water is used preferably in a range between 0.01 mol and 10 mol per 1 mol of the metal alkoxide.

As described above, the colored film having a red color shade has major constituents comprising silicon oxide, gold and at least one selected, if necessary, from a group consisting of zirconium oxide, tantalum oxide, titanium oxide, aluminum oxide and cerium oxide for controlling the color of the film. In addition, the film may comprise boron oxide having substantially the same efficiency as silicon oxide, for example, at a rate of 15 wt. % or less. The film may comprise bismuth oxide, zinc oxide, tin oxide, indium oxide, antimony oxide, vanadium oxide, hafnium oxide, chromium oxide, iron oxide, cobalt oxide and the like in a small amount, for example, 15 wt. % or less in total.

The organic coating solution for forming the colored film having a red color shade may be prepared by mixing organic solutions, each of which contains one of the raw materials, at a predetermined proportion.

Types and a mixing proportion of the materials constituting the colored film having a red color shade are preferable to be arranged in consideration of the each compatibility between the employed solvent and the raw compound, the stability of the compound for forming the colored film having a red color shade and the color tone, the resistance of abrasion and the chemical durability of the colored film having a red color shade.

The organic solvent used in forming the colored film having a red color shade is chosen in consideration of the method of applying the compound for forming the colored film having a red color shade. When the colored film having a red color shade is formed in gravure coating, flexographic printing or roll coating, the organic solvent is preferable to have a low evaporation rate because the solvent having a high evaporation rate evaporates before the film is sufficiently cared in the leveling process.

The evaporation rate of the solvent is generally evaluated by the relative index of the evaporation rate in which that of butyl acetate is taken as 100. A solvent having the index of equal to or less than 40 is classified as a solvent having an extremely low evaporation rate and is suitable for an organic solvent used in the gravure coating, the flexographic printing and the roll coating. For example, ethyl cellosolve, butyl cellosolve, cellosolve acetate, diethylene glycol monoethyl ether, hexylene glycol, diethylene glycol, ethylene glycol, tripropylene glycol, diacetone alcohol and tetrahydrofurfuryl alcohol are given.

The coating liquid of the present invention is preferred to include at least one of these solvents, and may include plurals of the solvents for controlling the viscosity and the surface tension of the coating liquid. Further a solvent having a high evaporation rate and over 100 relative evaporation rate including methanol (having the index of relative evaporation rate of 610), ethanol (having the index of relative evaporation rate of 340), n-propanol (having the index of relative evaporation rate of 300) may be added to the solvent having the index of relative evaporation rate of less than 40.

In the present invention, any method of applying the film is available and, for example, spin coating, dip coating, spray coating and printing are given. A printing method including gravure coating method, flexographic printing method, roll coating method and screen printing method is preferable because it can bring a high productivity and apply the compound for forming the colored film having a red color shade efficiently.

In the present invention, the compound for forming the colored film having a red color shade is applied onto the glass base by the applying method mentioned above and then dried at a temperature between 100° C. and 400° C. for 5 to 200 minutes under an oxidizing atmosphere. After that, the colored film having a red color shade of the present invention having a thickness between 30 nm and 300 nm is formed by baking it at a temperature in a range of 500° C. to 700° C. or more for 10 seconds to 5 minutes. The fine particles of gold contributing the color developing is formed due to drying and stabilized due to baking.

When the ultraviolet/infrared absorbent glass plate coated with the colored film having a red color shade onto only one surface thereof is employed for a windshield of a vehicle or a window glass of a building, the glass is preferable to be installed in a manner that the surface coated with the colored film having a red color shade thereon is directed to the inside of the vehicle or the building (or that the surface having no colored film thereon is directed to the outside of the vehicle or the building) so as to prevent damages to the colored film having a red color shade. In this case, since an excessively high visible light reflectance of the colored film-coated ultraviolet/infrared absorbent glass plate, particularly on the surface having no colored film, reduces the appearance by dazzling when seen from the outside of the vehicle or the building, the formulation of the colored film is recommended to be selected so that the visible light reflectance of the glass, particularly on the surface having no colored film is equal to or less than 10.0%.

The colored film-coated ultraviolet/infrared absorbent glass plate of the present invention is preferable to have a chromaticity of the transmitted light expressed as a, b in ranges of $-2 \leq a \leq 4$ and $-3 \leq b \leq 3$, and a lightness expressed as L in a range of $40 = L \leq 90$ by using the Lab coordinates when measured by using the CIE illuminant C, particularly a chromaticity in ranges of $-2 \leq a \leq 2$ and $-2 \leq b \leq 2$, and a lightness in a range of $50 \leq L \leq 90$, more particularly a chromaticity in ranges of $-1.0 \leq a \leq 1.0$ and $-1.0 \leq b \leq 1.0$, and a lightness in a range of $50 \leq L \leq 90$, most particularly a chromaticity in ranges of $-0.5 \leq a \leq 0.5$ and $-0.5 \leq b \leq 0.5$, and a lightness in a range of $50 \leq L \leq 90$.

The colored film-coated ultraviolet/infrared absorbent glass plate is preferable to have an ultraviolet transmittance (Tuv) specified by ISO 9050 of equal to or less than 15%, particularly equal to or less than 12%, more particularly equal to or less than 10%, and a solar rays transmittance (Tg) of equal to or less than 70%.

Particularly, when the colored film-coated ultraviolet/infrared absorbent glass plate is employed for a window glass of a vehicle, the color of the reflected light from the surface directing to the outside of the vehicle or the reflected light seen from the side of the surface having no colored film of the glass is preferable to have an almost neutral grayish color in view of appearance and the chromaticity in ranges of $-4.0 \leq a \leq 4.0$, $-5.0 \leq b \leq 3.0$, particularly in ranges of $-3.0 \leq a \leq 3.0$, $-3.0 \leq b \leq 3.0$. The visible light reflectance (Rg) of the surface having no colored film thereon and that of the surface coated with the colored film having a red color shade thereon are equal to or less than 10% respectively.

The colored film-coated ultraviolet/infrared absorbent glass plate of the present invention is preferable to have a thickness between 3.25 mm and 6.25 mm, the visible light transmittance of equal to or more than 70%, the solar energy transmittance of equal to or less than 70%, the ultraviolet transmittance of equal to or less than 15% and the chromaticity of the transmitted light in ranges of $-2 \leq a \leq 4$, $-3 \leq b \leq 3$.

The colored film-coated ultraviolet/infrared absorbent glass plate of the present invention may be formed into the laminated glass due to laminating it to the other glass plate (a colored or non-colored glass plate having no colored film and a glass plate of the same type as the colored film-coated ultraviolet/infrared absorbent glass plate of the present invention are available.) with an inner layer comprising transparent resin materials including polyvinyl butyral and polyester and having a thickness between about 0.2 mm and 2.0 mm preferably in such a manner that the colored film having a red color shade is arranged to be directed inward (or to be faced with an inner layer). The colored film-coated ultraviolet/infrared absorbent glass plate may be also formed into the double glazing unit in a manner that the colored film-coated ultraviolet/infrared absorbent glass plate and the other glass plate are arranged with a spacing (for example between 0.1 and 3 mm) preferably in such a manner that the colored film having a red color shade is arranged to be directed inward and are sealed by hermetic sealing around them to form a laminate having an inner space filled with dry air or gas or having a high vacuum level. The weatherability of the colored film having a red color shade can be improved due to laminating or arranging the glasses in such a manner that the colored film having a red color shade is arranged to be directed inward.

The laminated glass or the double glazing unit in the state of lamination is preferable to have the visible light transmittance (Ya) of equal to or more than 70% when measured by the CIE illuminant A, the solar energy transmittance (Tg) of equal to or less than 70%, the ultraviolet transmittance (Tuv) specified by ISO 9050 of equal to or less than 15% and the chromaticity expressed as a, b by using the Lab coordinates in ranges of $-2 \leq a \leq 4$ and $-3 \leq b \leq 3$ and is suitable particularly for the window glass of the vehicle. The laminated glass or the double glazing unit is preferable to have a thickness between 1.0 mm and 3.5 mm, particularly between 1.0 mm and 2.5 mm.

A laminated glass prepared due to laminating the colored film-coated ultraviolet/infrared absorbent 2.5 mm thick glass plate having a predetermined dimension and a curved shape and the ultraviolet/infrared absorbent glass plate having no colored film and the same size and shape as the former in one piece via a film of 0.7 mm thick comprising polyvinyl butyral in such a manner that the colored film having a red color shade is faced with the polyvinyl butyral film is given by way of example. The laminated glass plate can be produced from the flat colored film-coated ultraviolet/infrared absorbent glass and ultraviolet/infrared absorbent glass plate in conventional glass bending and laminating process. The laminated glass is particularly suitable for a window glass of a front door of a vehicle (a side window glass being beside the driver's seat) or front windshield.

Hereinafter, preferable embodiments of the present invention will be described referring to Examples and Comparative Examples.

In the following Example and Comparative Examples, the optical properties of the glass plate are measured as followings:

visible light transmittance (Ya): JIS R3106 (measuring by using the CIE illuminant A)

dominant wavelength (Dw): JIS Z8701 (measuring by using the CIE illuminant C)

excitation purity (Pe): JIS Z8701 (measuring by using the CIE illuminant C)

color tone of the transmitted light (chromaticity a, b, lightness L): JIS Z 8722, JIS Z8730 (measuring by using the CIE illuminant C)

color tone of the reflected light (chromaticity a, b): JIS Z 8722, JIS Z8730 ultraviolet transmittance (Tuv): ISO 9050 solar energy transmittance (Tg): JIS R3106 visible light reflectance (Rg): JIS R3106

[I] Hereinafter, some Examples and Comparative Examples of the ultraviolet/infrared absorbent glass and the ultraviolet/infrared absorbent glass plate will be described.

EXAMPLES 1 THROUGH 6

Glass raw materials were prepared by mixing silica sand, limestone, dolomite, soda ash, salt cake, ferric oxide, titanium oxide, cerium oxide, slug ash and carbonaceous reducing agent in proportions shown in Table 1 in which the contents is expressed as oxides and represented with percent by weight. Then, six glass raw materials were heated and melted in an electric furnace at 1450° C. respectively. After 4 hours' melting, each molten glass was flowed onto a stainless plate and annealed to the room temperature to obtain an about 10 mm thick glass plate. The glass plate were found to have a composition shown in Table 1 in which the content is represented with percent by weight.

TABLE 1

|  | Example 1 | Example 2 | Example 3 | Example 4 | Example 5 | Example 6 |
| --- | --- | --- | --- | --- | --- | --- |
| $SiO_2$ | 70.6 | 71.1 | 70.6 | 70.6 | 70.6 | 70.9 |
| $Al_2O_3$ | 1.45 | 1.4 | 1.55 | 1.4 | 1.5 | 1.4 |
| MgO | 4.2 | 4.0 | 4.0 | 3.9 | 4.0 | 4.0 |
| CaO | 8.5 | 8.0 | 8.0 | 8.5 | 8.0 | 8.0 |
| $Na_2O$ | 13.0 | 13.0 | 13.3 | 13.0 | 13.0 | 13.0 |
| $K_2O$ | 0.7 | 0.7 | 0.7 | 0.7 | 0.7 | 0.7 |
| $SO_3$ | 0.12 | 0 11 | 0.11 | 0.11 | 0.10 | 0.10 |
| $T-Fe_2O_3$ | 0.40 | 0.45 | 0.50 | 0.50 | 0.50 | 0.53 |
| $CeO_2$ | 0.90 | 1.20 | 1.20 | 1.20 | 1.50 | 1.20 |
| $TiO_2$ | 0.03 | 0.03 | 0.03 | 0.10 | 0.10 | 0.20 |

The glass plates were polished to reduce the thickness to almost 5.0 mm and then the optical properties of the plates were measured.

In Table 2, the content of FeO, the relative content of FeO against the total content of the iron oxide (the ratio of $FeO/T-Fe_2O_3$) and the optical properties of each sample obtained in the manner mentioned above are shown.

TABLE 2

|  | Example 1 | Example 2 | Example 3 | Example 4 | Example 5 | Example 6 |
|---|---|---|---|---|---|---|
| FeO | 0.088 | 0.107 | 0.104 | 0.116 | 0.108 | 0.127 |
| FeO/T-$Fe_2O_3$ | 0.244 | 0.264 | 0.231 | 0.257 | 0.240 | 0.266 |
| Ya [%] | 79.7 | 79.1 | 79.3 | 78.6 | 78.5 | 76.3 |
| Tg [%] | 59.0 | 56.3 | 57.3 | 55.3 | 56.2 | 53.3 |
| Tuv [%] | 14.7 | 12.3 | 11.3 | 11.0 | 9.3 | 9.3 |
| Dw [nm] | 507 | 504 | 510 | 521 | 524 | 533 |
| Pe [%] | 1.3 | 1.5 | 1.6 | 1.7 | 1.9 | 2.2 |
| a | −4.9 | −5.9 | −5.8 | −6.2 | −6.5 | −6.9 |
| b | 1.8 | 1.2 | 1.8 | 2.3 | 2.9 | 3.1 |

Table 2 shows that the samples of the present invention have a light greenish permeable color tone in which the visible light transmittance (Ya) is equal to or more than 75% when measured by using the CIE illuminant A, the dominant wavelength (Dw) is between 495 nm and 535 nm when measured by using the CIE illuminant C, the excitation purity (Pe) is equal to or less than 2.5%, the ultraviolet transmittance (Tuv) of equal to or less than 15%, the solar light transmittance (Tg) of equal to or less than 60%. The samples of the present invention have the chromaticity, which is expressed as a and b by using the Lab coordinates, including a value of "a" in a range of −8 to −3 and a value of "b" in a range of −1 to 4 through all Examples, especially in Examples 2 through 5, including a value of "a" in a range of −7 to −5 and a value of "b" in a range of 1 to 3 when measured by using the CIE illuminant C.

Comparative Examples 1 Through 5

Glass plates having a thickness of about 10 mm are prepared in such a manner that the five types of the glass raw materials are compounded, heated and melted as Example 1 to determine the optical properties.

The proportions of the compositions of these samples are shown in Table 3 in which the contents of each constituent are represented with percent by weight except when being represented with ppm.

In Table 4, the content of FeO, the relative content of FeO against the total iron oxide (FeO/T-$Fe_2O_3$) and the optical properties of each Comparative Example are shown the samples of Comparative Examples 1, 3 through 5 have a thickness of about 5 mm, and the sample of Comparative Example 2 has a thickness of about 4 mm.

TABLE 3

|  | Comparative Example 1 | Comparative Example 2 | Comparative Example 3 | Comparative Example 4 | Comparative Example 5 |
|---|---|---|---|---|---|
| $SiO_2$ | 70.6 | 71.5 | 71.0 | 69.9 | 70.4 |
| $Al_2O_3$ | 1.55 | 1.45 | 1.7 | 2.0 | 1.5 |
| MgO | 4.0 | 4.0 | 3.5 | 3.5 | 4.0 |
| CaO | 8.0 | 8.0 | 8.0 | 7.9 | 8.0 |
| $Na_2O$ | 13.3 | 13.0 | 12.3 | 12.8 | 13.0 |
| $K_2O$ | 0.7 | 0.7 | 0.5 | 1.1 | 0.70 |
| $SO_3$ | 0.11 | 0.11 | 0.6 | 0.18 | — |
| T-$Fe_2O_3$ | 0.50 | 0.74 | 0.60 | 0.63 | 0.55 |
| $CeO_2$ | 1.20 | 0.50 | 1.23 | 1.70 | 1.67 |
| $TiO_2$ | 0.03 | 0 | 0.31 | 0.30 | 0.14 |
| CoO | — | — | — | 2.4 ppm | — |
| $Cr_2O_3$ | — | — | — | 2.0 ppm | — |

TABLE 4

|  | Comparative Example 1 | Comparative Example 2 | Comparative Example 3 | Comparative Example 4 | Comparative Example 5 |
|---|---|---|---|---|---|
| FeO | 0.148 | 0.165 | 0.189 | 0.224 | 0.140 |
| FeO/T-$Fe_2O_3$ | 0.329 | 0.248 | 0.35 | 0.355 | 0.255 |
| Ya [%] | 76.1 | 74.2 | 72.8 | 67.1 | 71.9 |
| Tg [%] | 49.8 | 47.8 | 45.5 | 37.3 | 44.9 |
| Tuv [%] | 11.8 | — | 7.9 | 4.8 | 8.3 |
| Dw [nm] | 498 | 499 | 519 | 517 | 523 |
| Pe [%] | 3.3 | 3.3 | 2.4 | 3.3 | 2.45 |
| a | −7.2 | — | — | — | −8.2 |
| b | 0.3 | — | — | — | 3.4 |

The sample of Comparative Example 1 has a larger value of the ratio of FeO/T-$Fe_2O_3$ above the upper limit of the range of the present invention. The sample of Comparative Example 2 has contents of $CeO_2$ and FeO outside the range of the present invention. The sample of Comparative Example 3 has contents of the total iron oxide and FeO and the ratio of FeO/T-$Fe_2O_3$ outside the range of the present invention. The sample of Comparative Example 4 has contents of the total iron oxide, $CeO_2$ and FeO and the ratio of FeO/T-$Fe_2O_3$ outside the range of the present invention. The sample of Comparative Example 5 has content of $CeO_2$ outside the range of the present invention.

Comparative Examples 1, 2 and 4 have exceedingly high excitation purity (Pe) of more than 2.5%. These glasses of Comparative Examples 1, 2 and 4 exhibit to be deeply tinged with greenish color. Comparative Examples 2 through 5 have the visible light transmittance (Ya) of less than 75%. These glasses exhibit not to be provided with the sufficiently high visible light transmittance (Ya).

[II] Hereinafter, some Examples and Comparative Examples of the colored film-coated ultraviolet/infrared absorbent glass plate and the window glass of a vehicle will be described.

The proportion of the composition (represented with percent by weight) and the optical properties of the base glass used in the following Examples and Comparative Examples are shown in Table 5. The glasses have a thickness of 4.8 mm in the base glass 1, 4.9 mm in the base glass 2 and 4.80 mm in the base glass 3.

TABLE 5

|  | glass base 1 Examples 7–12 | glass base 2 Comaprative Examples 6, 7 | glass base 3 Comaprative Example 8 |
|---|---|---|---|
| $SiO2$ | 69.8 | 71.0 | 70.4 |
| $Al_2O_3$ | 1.51 | 1.53 | 1.5 |
| MgO | 3.17 | 4.06 | 4.0 |
| CaO | 8.74 | 8.62 | 8.0 |
| $Na_2O$ | 14.4 | 12.3 | 13.0 |
| $K_2O$ | 0.78 | 0.76 | 0.70 |
| $SO_3$ | 0.11 | — | — |
| T-$Fe_2O_3$ | 0.50 | 0.52 | 0.55 |
| $CeO_2$ | 1.20 | — | 1.67 |
| $TiO_2$ | 0.03 | — | 0.14 |
| FeO | 0.108 | 0.128 | 0.140 |
| FeO/T-$Fe_2O_3$ | 0.240 | 0.246 | 0.25 |
| index of refraction | 1.51 | 1.51 | 1.51 |
| visible light transmittance (Ya) [%] | 79.0 | 76.0 | 71.9 |
| visible light reflectance (Rg) [%] | 7.2 | 6.9 | 6.6 |
| solar energy transmittance (Tg) [%] | 57.0 | 51.6 | 44.9 |

TABLE 5-continued

| | glass base 1 Examples 7–12 | glass base 2 Comaprative Examples 6, 7 | glass base 3 Comaprative Example 8 |
|---|---|---|---|
| ultraviolet transmittance (Tuv) [%] | 11.5 | 24.3 | 8.3 |
| dominant wavelength (Dw) [min] | 518 | 500 | 523 |
| excitation purity (Pe) [%] | 1.6 | 2.49 | 2.45 |
| color tone | green | green | green |
| chromaticity of the transmitted light a | −5.7 | −1.7 | −8.2 |
| chromaticity of the transmitted light b | 2.3 | −0.7 | 3.4 | propane acrylate ethylen oxide are added into the mixture with amounts shown in Table 6 to prepare coating liquids 1G through 1K.

The coating liquids 1G through 1K prepared in the manner mentioned above are applied respectively onto a surface of a sample of the green-colored base glass 1 having a thickness of 4.8 mm and an area of 100 mm×100 mm by spin coating at a revolution of 1000 rpm to 2000 rpm as shown in Table 7. After dried by air, the samples are heated at 250° C. for 2 hours to separate the fine particles of the gold. After that, the samples are baked at 720° C. for 120 second to provide the glass plates having the colored film having a red color shade. Examples 7 through 11 correspond to the colored film-coated ultraviolet/infrared absorbent glass plates applied with the coating liquid 1G through 1K in order respectively.

TABLE 6

| Examples | coating liquid | stock solution A [g] | stock solution B [g] | stock solution C [g] | stock solution D [g] | stock solution E [g] | stock solution F [g] | EC [g] | E06 [g] |
|---|---|---|---|---|---|---|---|---|---|
| 7 | 1G | 0.13 | 0.13 | 4.74 | — | — | 3.0 | 12.0 | — |
| 8 | 1H | 0.26 | 0.24 | 4.50 | — | — | 2.6 | 12.4 | — |
| 9 | 1I | — | — | 5.0 | — | — | 2.4 | 12.4 | 0.2 |
| 10 | 1J | — | — | 2.7 | 1.02 | — | 2.4 | 5.74 | — |
| 11 | 1K | — | — | 2.7 | — | 0.35 | 2.3 | 6.15 | — |

EC: ethyl cellosolve
E06: 6 adducted trimethylolpropane acrylate ethylele oxide

EXAMPLES 7 THROUGH 11

Hexahydrated cerium nitrate is added into the ethyl cellosolve in such a manner to include 23.2 wt. % cerium oxide in a shape expressed as $CeO_2$ of a solid mater within the solution and then warmed at 90° C. for one hour to prepare a cerium nitrate stock solution A.

2 mol acetylacetone is dropped into 1 mol titanium isopropoxide being agitated by using a dropping funnel to prepare a titanium oxide stock solution B. The stock solution B includes 16.5 wt. % titanium oxide expressed as $TiO_2$ of a solid matter.

9 g 1.0N hydrochloric acid and 41 g ethyl cellosolve are added into 50 g ethyl silicate ("Ethyl Silicate 40", Col Coat co.) and then agitated at a room temperature for two hours to prepare a silicon oxide stock solution C. The stock solution C includes 20 wt. % silicon oxide expressed as $SiO_2$ of a solid matter.

130.1 g ethyl acetoacetate and 643.1 g ethyl cellosolve are added into 246.3 g aluminum(III)-s-butoxide and then agitated at a room temperature for two hours to prepare an aluminum oxide stock solution D.

27 g of 1.0N hydrochloric and 217.2 g of ethyl cellosolve are added into 103.9 g boron methoxide and then agitated at a room temperature for two hours to prepare a boron oxide stock solution E.

Tetrahydrated chloroauric acid is solved in ethyl cellosolve to prepare a chloroauric acid stock solution F having a concentration of 10 wt. %.

The cerium nitrate stock solution A, the titanium oxide stock solution B, the silicon oxide stock solution C, the aluminum oxide stock solution D, the boron oxide stock solution E and the chloroauric acid stock solution F are mixed together at a proportion shown in Table 6 and then ethyl cellosolve and, if necessary, hexaadditional trimethylol

TABLE 7

| condition of coating | |
|---|---|
| Examples | spin revolution [rpm] |
| 7 | 1500 |
| 8 | 2000 |
| 9 | 1500 |
| 10 | 2000 |
| 11 | 2000 |

The composition, the thickness and the index of refraction of each colored film having a red color shade are shown in Table 8. The visible light transmittance (Ya), the solar energy transmittance (Tg), the ultraviolet transmittance (Tuv), the chromaticity a and b of the transmitted light defined by Lab coordinates and the chroma ($(a^2+b^2)^{1/2}$) of each sample are shown in Table 9. The visible light reflectance on the glass surface, the chromaticity a and b defined by Lab coordinates of the reflected light on the glass surface of each sample measured respectively in such a manner to project a light from the side where the surface of the glass has no film, and the visible light reflectance on the film surface and the chromaticity a, b defined by Lab coordinates of the reflected light on the film surface of each sample measured respectively in such a manner to project a light from the side where the surface of the glass has the colored film are also shown in Table 10.

As shown in Tables. 9 and 10, the colored films having a red color shade of Examples exhibit the preferable chemical resistance and resistance of abrasion. Each ultraviolet/ infrared absorbent glass plate coated with the colored film having a red color shade of each Example has the visible light transmittance (Ya) of equal to or more than 70%, the ultraviolet transmittance (Tuv) of equal to or less than 12%, solar energy transmittance (Tg) of equal to or less than 60%, the reflectance (Rg) on the glass surface of equal to or less than 9% and the reflectance (Rg) on the film surface of equal to or less than 9%.

The composition of the coating liquid, the number of revolution of the coating spin, and the composition, the thickness and the index of refraction of the colored film are shown in Table 11. The visible light transmittance (Ya), the solar energy transmittance (Tg), the ultraviolet transmittance

TABLE 8

| Examples | film | composition of the film [wt. %] | | | | | | thickness of the film [nm] | index of refraction |
|---|---|---|---|---|---|---|---|---|---|
| | | $SiO_2$ | $TiO_2$ | $CeO_2$ | $Al_2O_3$ | $B_2O_3$ | Au | | |
| 7 | colored film with a red color shade | 82.9 | 1.8 | 2.7 | — | — | 12.5 | 110 | 1.48 |
| 8 | colored film with a red color shade | 80.1 | 3.6 | 5.3 | — | — | 11.0 | 100 | 1.50 |
| 9 | colored film with a red color shade | 89.7 | — | — | — | — | 10.3 | 120 | 1.46 |
| 10 | colored film with a red color shade | 70.8 | — | — | 13.2 | — | 16.0 | 90 | 1.49 |
| 11 | colored film with a red color shade | 74.5 | | | | 9.46 | 16.0 | 85 | 1.47 |

TABLE 9

| Examples | visible light transmittance Ya [%] | solar energy transmittance Tg [%] | ultraviolet transmittance Tuv [%] | chromaticity and lightness of the transmitted light (a/b/L) | chroma of the transmitted light $((a^2 + b^2)^{1/2})$ |
|---|---|---|---|---|---|
| 7 | 74.0 | 57.0 | 9.1 | −0.1/0.1/85 | 0.1 |
| 8 | 72.2 | 56.3 | 9.5 | 0.2/0.2/85 | 0.28 |
| 9 | 73.6 | 56.8 | 9.3 | −0.2/0.0/85 | 0.2 |
| 10 | 71.8 | 56.5 | 9.5 | 0.3/−0.1/84 | 0.32 |
| 11 | 72.7 | 56.9 | 9.8 | 0.1/0.2/85 | 0.22 |

TABLE 10

| Examples | visible light reflectance on the glass surface [%] | chromaticity of the reflected light on the glass surface (a/b) | visible light reflectance on the film surface [%] | chromaticity of the reflected light on the film surface (a/b) |
|---|---|---|---|---|
| 7 | 7.8 | 0.81/0.8 | 7.9 | 0.69/2.72 |
| 8 | 7.7 | 1.12/1.0 | 8.8 | −0.03/2.97 |
| 9 | 7.1 | 0.8/0.5 | 7.9 | 0.83/1.85 |
| 10 | 7.5 | 0.45/1.8 | 7.3 | 0.52/1.43 |
| 11 | 7.6 | 0.35/1.3 | 7.5 | 0.21/1.65 |

Comparative Examples 6, 7

2.5 g silicon oxide stock solution C is added with 5.9 g ethyl cellosolve at first, and then added with 0.1 g hexaadditional trimethylol propane acrylate ethylen oxide. After that, the solution is added with 1.5 g chloroauric acid stock solution F and agitated to prepare the coating liquid L.

2.5 g silicon oxide stock solution C is added with 6.4 g ethyl celloslove at first, and then added with 0.1 g hexaadditional trimethylol propane acrylate ethylen oxide. After that, the solution is added with 1.0 g chlorauric acid stock solution F and agitated to prepare the coating liquid M.

The coating liquids L, M are relatively applied onto a surface of the green-colored glass base 2 having a thickness of 4.9 mm and an area of 100 mm×100 mm by spin coating at a revolution of 1000 rpm or 3000 rpm for 15 seconds as shown in Table. 11. After dried by air, the sample is heated at 250° C. for 2 hours to separate the fine particles of gold. After that, the sample is baked at 720° C. for 120 seconds to provide the glass plate having the colored film.

(Tuv), the chromaticity expressed as a, b defined by the Lab coordinates and the chroma $((a^2+b^2)^{1/2})$ of the transmitted light relating to the colored film-coated glass are shown in Table 12. The visible light reflectance on the surface of the glass, the chromaticity a, b defined by Lab coordinates of the reflected light on the surface of the glass measured respectively in such a manner to project a light from the side where the surface of the glass has no film are shown in Table 13. The visible light reflectance on the surface of the film and the chromaticity a, b defined by Lab coordinates of the reflected light on the surface of the film measured respectively in such a manner to project a light from the side where the surface of the glass has the colored film are also shown in Table 13.

Tables 12, 13 show that the colored film-coated glasses provided as mentioned above have the visible light transmittance of equal to or more than 70%, the chromaticity having a grayish color tone, the ultraviolet transmittance (Tuv) in a range of 21.7 to 21.8% which is higher than that of Examples 7 through 11 by 10% or more. The glasses are not sufficiently improved in the ultraviolet transmittance.

TABLE 11

| Comparative Examples | stock solution C [g] | E06 [g] | EC [g] | stock solution F [g] | spin revolution [rpm] | composition of the film [wt. %] SiO$_2$ | Au | thickness of the film [nm] | index of refraction |
|---|---|---|---|---|---|---|---|---|---|
| 6 | 2.5 | 0.1 | 5.9 | 1.5 | 3000 | 87.5 | 12.5 | 70 | 1.46 |
| 7 | 2.5 | 0.1 | 6.4 | 1.0 | 1000 | 91.3 | 8.7 | 120 | 1.46 |

EC: ethyl cellosolve
E06: 6 adducted trimethylolpropane acrylate ethylele oxide

TABLE 12

| Comparative Examples | visible light transmittance Ya [%] | solar energy transmittance Tg [%] | ultraviolet transmittance Tuv [%] | chromaticity of the transmitted light (a/b/L) | chroma of the transmitted light $((a^2 + b^2)^{1/2})$ |
|---|---|---|---|---|---|
| 6 | 70.8 | 50.1 | 21.7 | −1.53/−0.07 | 1.53 |
| 7 | 72.2 | 50.9 | 21.8 | −1.75/0.57 | 1.84 |

TABLE 13

| Comparative Examples | visible light reflectance on the glass surface [%] | chromaticity of the reflected light on the glass surface (a/b) | visible light reflectance on the film surface [%] | chromaticity of the reflected light on the film surface (a/b) |
|---|---|---|---|---|
| 6 | 7.11 | −0.82/0.36 | 6.53 | 0.51/1.59 |
| 7 | 5.69 | −1.51/0.06 | 5.07 | 0.73/−1.56 |

Comparative Example 8

2.5 g silicon oxide stock solution C is added with 5.85 g ethyl cellosolve at first, and then added with 0.15 g hexaadditional trimethylol propane acrylate ethylen oxide. After that, the solution is added with 1.5 g chloroauric acid stock solution F prepared in Examples 7 through 11, and then the solution is agitated to prepare the coating liquid. The coating liquid L is applied onto the surface of the green-colored glass base 3 having a thickness of 4.80 mm and an area of 100 mm×100 mm in the spin coating process at a revolution of 2000 rpm for 15 seconds to prepare a sample. After dried by air, the sample is heated at 250° C. for 2 hours to separate the fine particles of the gold. After that, the sample is reheated to 610° C. in 2 hours in the hot oven and retained therein for 10 minutes, and then the sample is cooled naturally to prepare the glass plates having the colored film.

The colored film comprises 87.5 wt. % SiO$_2$ and 12.5 wt. % Au and has the index of refraction of 1.48 and the thickness of 110 nm. The optical properties of the colored film including the visible light transmittance, the visible light reflectance, the color tone of the transmitted light and the like is shown in Table 14 in which the visible light transmittance (Ya) is shown to be less than 70%.

TABLE 14

| | |
|---|---|
| visible light transmittance Ya [%] | 66.7 |
| solar energy transmittance Tg [%] | 46.7 |
| ultraviolet transmittance Tuv [%] | 7.8 |
| chromaticity and lightness of the transmitted light (a/b/L) | −1.72/0.73/81.8 |
| chroma of the transmitted light $((a^2 + b^2)^{1/2})$ | 1.87 |
| visible light reflectance on the glass surface [%] | 7.04 |
| chromaticity of the reflected light on the glass surface (a/b) | −0.82/0.88 |
| chromaticity of the reflected light on the film surface (a/b) | 2.88/0.87 |

EXAMPLE 12

260.3 g ethylacetylacetate is added into 388.7 g tetrabutoxy zirconium and agitated for 2 hours to prepare the zirconium oxide stock solution M. The solution includes 17.8 wt. % zirconium oxide expressed as ZrO$_2$ of a solid matter.

60 g ethyl cellosolve is added into 40 g hexahydrated cobalt nitrate and taken into solution to prepare the cobalt oxide stock solution N. The solution includes 10.3 wt. % cobalt oxide expressed as CoO of a solid matter.

The silicon oxide stock solution C, the zirconium oxide stock solution M, the cobalt oxide stock solution N and the chloroauric acid stock solution F are mixed at a proportion shown in Table 15. Then, ethyl cellosolve (EC) is added into the mixture at a rate shown in Table 15 to prepare the coating liquid.

The coating liquid is applied onto a surface of the green colored base glass 1 having a thickness of 4.8 mm and an area of 100 mm×100 mm by spin coating at a revolution of 2500 rpm to prepare a sample. After dried by air, the sample is heated at 250 ° C. for 2 hours to separate the fine particles of gold. After that, the sample is baked at 720° C. for 120 seconds to prepare glass plate having a colored film.

TABLE 15

| Example | stock solution C [g] | stock solution F [g] | stock solution M [g] | stock solution N [g] | EC [g] |
|---|---|---|---|---|---|
| 12 | 4.0 | 2.0 | 0.5 | 0.5 | 4.5 |

EC: ethyl cellosolve

The optical properties including composition, the thickness, and the index of refraction of the colored film and the visible light transmittance (Ya), the solar energy transmittance (Tg), the ultraviolet transmittance (Tuv), the chromaticity and the lightness of the transmitted light, the visible light reflectance and color tone of the reflected light are shown in Tables 16, 17.

The colored films exhibit the desired chemical resistance and resistance of abrasion. The colored film-coated glass plates have the visible light transmittance (Ya) of equal to or more than 70%, the ultraviolet transmittance (Tuv) of equal to or less than about 12%, the solar energy transmittance (Tg) of equal to or less than 60%, the visible light reflectance on the surface of the glass of equal to or less than 9% and the visible light reflectance on the surface of the colored film of equal to or less than 9%.

TABLE 16

| Example | film | composition of the film [wt. %] | | | | thickness of the film [nm] | index of refraction |
|---|---|---|---|---|---|---|---|
| | | $SiO_2$ | $ZrO_2$ | CoO | Au | | |
| 12 | colored film | 77.1 | 8.58 | 5.01 | 9.3 | 90 | 1.52 |

TABLE 17

| Example | visible light transmittance Ya [%] | solar energy transmittance Tg [%] | ultraviolet transmittance Tuv (ISO) [%] | chromaticity and lightness of the transmitted light (a/b/L) | chroma of the transmitted light $((a^2 + b^2)^{1/2})$ |
|---|---|---|---|---|---|
| 12 | 71.0 | 56.1 | 9.3 | 0.3/−0.5/84 | 0.58 |

TABLE 18

| Example | visible light reflectance on the glass surface [%] | chromaticity of the reflected light on the glass surface (a/b) | visible light reflectance on the film surface [%] | chromaticity of the reflected light on the film surface (a/b) |
|---|---|---|---|---|
| 12 | 7.9 | 0.81/0.4 | 8.1 | 0.69/2.32 |

INDUSTRY APPLICABILITY

As detailed above, according to the present invention, the ultraviolet/infrared absorbent glass and the ultraviolet/infrared absorbent glass plate securing the relatively high visible light transmittance and having the superior ultraviolet absorptivity and the suitable infrared absorptivity can be provided without bringing an exceedingly deep greenish tone.

The ultraviolet/infrared absorbent glass and the ultraviolet/infrared absorbent glass plate of the present invention is available particularly for a glass desired to have a pale tone, a window glass of a vehicle applied with the coatings or a window glass of a building because of their relatively lighter greenish color tone and high visible light transmittance.

Further, according to the present invention, the colored film-coated ultraviolet/infrared absorbent glass plate having the high visible light transmittance, the neutral gray tone and the superior ultraviolet transmittance can be provided. A desired window glass of a vehicle can be provided due to employing the colored film-coated ultraviolet/infrared absorbent glass plate.

What is claimed is:

1. A colored film-coated ultraviolet/infrared absorbent glass plate consisting of base glass, colorants, and a colored film, said base glass comprising:

65 to 80 wt. % $SiO_2$;
0 to 5 wt. % $Al_2O_3$;
0 to 10 wt. % MgO;
5 to 15 wt. % CaO;
10 to 18 wt. % $Na_2O$;
0 to 5 wt. % $K_2O$;
5 to 15 wt. % total amount of MgO and CaO;
10 to 20 wt. % total amount of $Na_2O$ and $K_2O$;
0.05 to 0.3 wt. % of $SO_3$; and
0 to 5 wt. % $B_2O_3$, said colorants comprising:

0.35 to 0.55 wt. % total iron oxide (T-$Fe_2O_3$) expressed as $Fe_2O_3$;
0.08 to 0.15 wt. % FeO;
0.8 to 1.5 wt. % $CeO_2$; and
0 to 0.5 wt. % $TiO_2$,
FeO expressed as $Fe_2O_3$ being equal to or more than 20 wt. % and less than 27 wt. % of T-$Fe_2O_3$, and said colored film having a red color shade with a thickness between 30 nm and 300 nm and including fine particles of gold and silicon oxide of more than 50 wt. % and equal to or less than 95 wt. %, said colored film being applied onto a surface of the ultraviolet/infrared absorbent glass plate, wherein said base glass and colorants have following properties: visible light transmittance is equal to or more than 75% when measured by using CIE illumination A, solar energy transmittance is equal to or less than 60%, ultraviolet transmittance specified by ISO is equal to or less than 15%, dominant wavelength is in a range of 495 to 535 nm when measured by using CIE illuminant C, and excitation purity is equal to or less than 2.5% when measured by using the CIE illumination C.

2. A colored film-coated ultraviolet/infrared absorbent glass plate as claimed in claim 1, wherein said visible light transmittance is equal to or more than 77.5%.

3. A colored film-coated ultraviolet/infrared absorbent glass plate as claimed in claim 1, wherein said excitation purity is equal to or less than 2.0%.

4. A colored film-coated ultraviolet/infrared absorbent glass plate as claimed in claim 1, wherein chromaticity of transmitted light expressed as a, b of Lab coordinates when measured by using CIE illuminance is in ranges of $-8 \leq a \leq -3$ and $-1 \leq b \leq 4$.

5. A colored film-coated ultraviolet/infrared absorbent glass plate as claimed in claim 4, wherein said chromaticity is in ranges of $-7 \leq a \leq -5$ and $1 \leq b \leq 3$.

6. A colored film-coated ultraviolet/infrared absorbent glass plate as claimed in claim 1, wherein the glass plate has a thickness between 3.25 mm and 6.25 mm.

7. A colored film-coated ultraviolet/infrared absorbent glass plate as claimed in claim 1, wherein the colored film having the red color shade comprises at least one selected from a group consisting of zirconium oxide, tantalum oxide, titanium oxide, aluminum oxide and cerium oxide in a range of 0 to 30 wt. % and fine particles of gold in a range of 5 to 20 wt. %.

8. A colored film-coated ultraviolet/infrared absorbent glass plate as claimed in claim 7, wherein the colored film having the red color shade comprises silicon oxide in a range of 60 to 93 wt. %, at least one selected from a group consisting of zirconium oxide, tantalum oxide, titanium oxide, aluminum oxide and cerium oxide in a range of 0 to 15 wt. % and the fine particles of gold in a range of 7 to 17 wt. %.

9. A colored film-coated ultraviolet/infrared absorbent glass plate as claimed in claim 1, wherein chromaticity of transmitted light expressed as a, b of Lab coordinates when measured by using CIE illuminance is in ranges of $-2 \leq a \leq 4$ and $-3 \leq b \leq 3$ and lightness expressed as L is in a range of $40 \leq L \leq 90$.

10. A colored film-coated ultraviolet/infrared absorbent glass plate as claimed in claim 9, wherein said chromaticity is in ranges of $-2 \leq a \leq 2$ and $-2 \leq b \leq 2$ and said lightness L is in a range of $50 \leq L \leq 90$.

11. A colored film-coated ultraviolet/infrared absorbent glass plate as claimed in claim 10, wherein said chromaticity is in ranges of $-1.0 \leq a \leq 1.0$ and $-1.0 \leq b \leq 1.0$ and said lightness L is in a range of $50 \leq L \leq 90$.

12. A colored film-coated ultraviolet/infrared absorbent glass plate as claimed in claim 11, wherein said chromaticity is in ranges of $-0.5 \leq a \leq 0.5$ and $-0.5 \leq b \leq 0.5$ and said lightness L is in a range of $50 \leq L \leq 90$.

13. A colored film-coated ultraviolet/infrared absorbent glass plate as claimed in claim 1, wherein the ultraviolet transmittance specified by ISO is equal to or less than 15%.

14. A colored film-coated ultraviolet/infrared absorbent glass plate as claimed in claim 13, wherein the ultraviolet transmittance specified by ISO is equal to or less than 12%.

15. A colored film-coated ultraviolet/infrared absorbent glass plate as claimed in claim 1, wherein solar energy transmittance is equal to or less than 70%.

16. A colored film-coated ultraviolet/infrared absorbent glass plate as claimed in claim 1, wherein the visible light transmittance is equal to or more than 70%.

17. A colored film-coated ultraviolet/infrared absorbent glass plate as claimed in claim 1, wherein the glass plate has a thickness between 3.25 mm and 6.25 mm, and has the visible light transmittance of equal to or more than 70%, the solar energy transmittance of equal to or less than 70%, the ultraviolet transmittance of equal to or less than 15% and chromaticity expressed as a, b by using Lab coordinates in ranges of $-2 \leq a \leq 4$ and $-3 \leq b \leq 3$.

18. A window glass of a vehicle comprising at lest two glass plates laminated with an inner layer of a transparent resin or a spacing therebetween wherein at least one of said glass plates employs the colored film-coated ultraviolet/infrared absorbent glass plate as claimed in claim 1 and wherein the window glass has the visible light transmittance measured by using the CIE illuminance A of equal to or more than 70%, the solar energy transmittance of equal to or less than 70%, the ultraviolet transmittance specified by ISO of equal to or less than 15%, and chromaticity of the transmitted light expressed as a, b of Lab coordinates in ranges of $-2 \leq a \leq 4$ and $-3 \leq b \leq 3$ when measured by using the CIE illuminant.

19. A window glass of a vehicle as claimed in claim 18, wherein all of said glass plates have a thickness between 1.0 to 3.5 mm and at least one of said glass plates is installed in such a manner that a surface coated with the colored film having a red color shade is directed to an inner side of said window glass of a vehicle.

* * * * *